United States Patent
Gao et al.

(10) Patent No.: US 11,178,632 B2
(45) Date of Patent: Nov. 16, 2021

(54) TIME SERVICE METHOD, TERMINAL DEVICE, AND NETWORK DEVICE

(71) Applicant: Huawei Technologies Co., Ltd., Shenzhen (CN)

(72) Inventors: Feng Gao, Shenzhen (CN); Guangwei Yu, Beijing (CN); Feng Yu, Beijing (CN); Wurong Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/515,747

(22) Filed: Jul. 18, 2019

(65) Prior Publication Data

US 2019/0342849 A1 Nov. 7, 2019

Related U.S. Application Data

(63) Continuation of application No. PCT/CN2017/114995, filed on Dec. 7, 2017.

(30) Foreign Application Priority Data

Jan. 24, 2017 (CN) .......................... 201710055195.3

(51) Int. Cl.
*H04W 56/00* (2009.01)

(52) U.S. Cl.
CPC ..... *H04W 56/0045* (2013.01); *H04W 56/001* (2013.01); *H04W 56/003* (2013.01)

(58) Field of Classification Search
CPC ........... H04W 56/0045; H04W 56/001; H04W 56/003; H04W 56/0055
See application file for complete search history.

(56) References Cited

U.S. PATENT DOCUMENTS

2007/0147562 A1  6/2007  Eidson
2013/0336268 A1  12/2013 Better et al.
(Continued)

FOREIGN PATENT DOCUMENTS

CN  101098219 A  1/2008
CN  101489238 A  7/2009
(Continued)

OTHER PUBLICATIONS

Ericsson, "Time Synchronization between BM-SCs and MBMS Ues," 3GPP TSG-SA4 #36 Meeting, S4-050831, Bordeaux, France, Nov. 13-18, 2005, 8 pages.
(Continued)

*Primary Examiner* — Jackie Zuniga Abad
(74) *Attorney, Agent, or Firm* — Slater Matsil, LLP

(57) ABSTRACT

Embodiments of the present disclosure provide a time service method, a terminal device, and a network device. The method includes: determining, by a terminal device, a first moment of a first downlink message, and determining a second moment of the first downlink message; determining, by the terminal device, a third moment of a first uplink message, and determining a fourth moment of the first uplink message; and determining, by the terminal device, a time offset between the terminal device and the network device based on the first moment, the second moment, the third moment, and the fourth moment. According to the method provided, a time service error is effectively reduced.

20 Claims, 5 Drawing Sheets

(56) References Cited

U.S. PATENT DOCUMENTS

| | | |
|---|---|---|
| 2014/0092759 A1 | 4/2014 | Pisharody et al. |
| 2014/0254511 A1 | 9/2014 | Aldana et al. |
| 2015/0181366 A1* | 6/2015 | Chae .................. H04W 72/048 |
| | | 370/336 |
| 2016/0029336 A1* | 1/2016 | Aldana ............... H04W 56/003 |
| | | 370/350 |
| 2017/0013488 A1 | 1/2017 | Kazmi et al. |

FOREIGN PATENT DOCUMENTS

| | | |
|---|---|---|
| CN | 101510801 A | 8/2009 |
| CN | 101615946 A | 12/2009 |
| CN | 103370971 A | 10/2013 |
| CN | 105027643 A | 11/2015 |
| JP | 2003315478 A | 11/2003 |
| KR | 101421988 B1 | 7/2014 |

OTHER PUBLICATIONS

"Network Time Protocol," From Wikipedia, the free encyclopedia, Jun. 6, 2015, 10 pages.

IEEE Strandard for a Precision Clock Synchronization Protocol for Networked Measurement and Control Systems, IEEE Instrumentation and Measurement Society, Sponsored by the Technical Committee on Sensor Technology (TC-9), IEEE Std 1588-2008, Jul. 24, 2008, New York, NY, 289 pages.

\* cited by examiner

TIME SERVICE METHOD, TERMINAL DEVICE, AND NETWORK DEVICE

CROSS-REFERENCE TO RELATED APPLICATIONS

This application is a continuation of International Application No. PCT/CN2017/114995, filed on Dec. 7, 2017, which claims priority to Chinese Patent Application No. 201710055195.3, filed on Jan. 24, 2017. The disclosures of the aforementioned applications are hereby incorporated by reference herein in their entireties.

TECHNICAL FIELD

Embodiments of the present disclosure relate to the communications field, and more specifically, to a time service method, a terminal device, and a network device.

BACKGROUND

With the development of industrial automation, industrial robots are more widely applied to industrial production. In many scenarios, industrial robots need to work collaboratively. The industrial robots need to exchange information for collaborative working. In addition to information exchange, high-precision absolute time synchronization is required between the robots to facilitate collaborative working.

In an industrial scenario, communication between industrial robots mainly uses a time sensitive network (Time sensitive network, TSN) technology. A TSN may provide a communication service, and may further provide a time service for robots.

However, the TSN is based on a wired Ethernet technology, and the industrial robots need to connect to an Ethernet cable to carry out production. The industrial robots based on the TSN technology have defects in two aspects. In a first aspect, a wired network is complex in construction and deployment, and later maintenance is highly difficult. In a second aspect, mobility of the industrial robots is limited because the industrial robots need to connect to the Ethernet cable.

In an existing cellular network system, time synchronization between a terminal and a base station is time alignment based on a frame boundary, and absolute time synchronization is not supported. Specifically, regardless of uplink synchronization or downlink synchronization, time alignment of a frame boundary of a received signal is implemented to correctly demodulate data. A problem of a delay in a signal transmission process is not considered in the time service method. As a result, a time service error occurs when a delay exists during signal transmission.

SUMMARY

Embodiments of the present disclosure provide a time service method, a terminal device, and a network device, to effectively reduce a time service error.

According to a first aspect, a time service method is provided, where the method includes:

determining, by a terminal device, a first moment of a first downlink message, and determining a second moment of the first downlink message, where the first moment is a start moment of a time unit used by a network device to send the first downlink message, and the second moment is a start moment of a time unit used by the terminal device to receive the first downlink message;

determining, by the terminal device, a third moment of a first uplink message, and determining a fourth moment of the first uplink message, where the third moment is a start moment of a time unit used by the terminal device to send the first uplink message, and the fourth moment is a start moment of a time unit used by the network device to receive the first uplink message; and determining, by the terminal device, a time offset between the terminal device and the network device based on the first moment, the second moment, the third moment, and the fourth moment.

According to the time service method provided in this embodiment of the present disclosure, uplink and downlink propagation delays are considered for the terminal device, and a time service based on absolute time can be provided for the terminal device by using the first moment and the second moment of the first downlink message and the third moment and the fourth moment of the first uplink message, thereby effectively reducing a time service error.

In a possible design, before the determining, by a terminal device, a first moment and a second moment of a first downlink message, the method further includes:

receiving, by the terminal device, cell time service information sent by the network device, where the cell time service information includes downlink resource information of the first downlink message; and receiving, by the terminal device based on the downlink resource information, the first downlink message sent by the network device.

In a possible design, the receiving, by the terminal device, cell time service information sent by the network device includes: receiving, by the terminal device, system information block SIB information broadcast by the network device, where the SIB information includes the cell time service information.

In a possible design, the cell time service information further includes a multicast-radio network temporary identifier TG-RNTI of a second message; and the determining, by a terminal device, a first moment of a first downlink message includes: receiving, by the terminal device based on the TG-RNTI, the second message sent by the network device, where the second message includes the first moment.

In a possible design, the cell granting information further includes an initial timestamp of the network device, and the initial timestamp is a start moment corresponding to an initial time unit of a frame period.

In a possible design, the determining, by a terminal device, a first moment of a first downlink message includes: determining, by the terminal device, an expected moment of the first moment based on the start absolute time and according to the following formula; and determining, by the terminal device, the first moment based on the expected moment of the first moment:

$$T_{1exp} = T + n \times t_1 + m \times t_2, \text{ where}$$

$T_{1exp}$ represents the expected moment of the first moment, T represents the initial timestamp, n represents a frame number of the first downlink message, m represents a subframe number of the first downlink message, $t_1$ represents a time length of a frame, and $t_2$ represents a time length of a subframe.

In a possible design, the cell time service information further includes a multicast-radio network temporary identifier TG-RNTI of a second message; and the determining, by the terminal device, the first moment based on the expected moment of the first moment includes: receiving, by the terminal device based on the TG-RNTI, the second message sent by the network device, where the second message includes a value of an offset between the first moment and the expected moment of the first moment; and determining, by the terminal device, the first moment based on the expected moment of the first moment and according to the following formula:

$T_1 = T_{1exp} + \Delta T_1$, where $T_1$ represents the first moment, and $\Delta T_1$ represents the value of the offset between the first moment and the expected moment of the first moment.

In this embodiment of the present disclosure, it is avoided that the network device sends a complete first moment to the terminal device, and the network device only needs to send the value of the offset between the first moment and the expected moment of the first moment to the terminal device, so that the first moment of the first downlink message can be determined. This effectively reduces transmission overheads of an air interface.

In a possible design, the determining, by the terminal device, the first moment based on the expected moment of the first moment includes: determining, by the terminal device, the expected moment of the first moment as the first moment.

In this embodiment of the present disclosure, information exchange between the network device and the terminal device is further reduced, and it is avoided that the network device sends the second message to the terminal device, thereby further reducing transmission overheads of the air interface.

In a possible design, the determining, by a terminal device, a second moment of the first downlink message includes: determining, by the terminal device, a detection moment of the first downlink message, where the detection moment of the first downlink message is a start moment of receiving, by the terminal device, the first downlink message; determining, by the terminal device, a value of an offset between the detection moment of the first downlink message and the second moment; and determining, by the terminal device, the second moment according to the following formula:

$T_2 = T_2' - \Delta t_d$, where $T_2$ represents the second moment, $T_2'$ represents the detection moment of the first downlink message, and $\Delta t_d$ represents the value of the offset between the detection moment of the first downlink message and the second moment.

In a possible design, before the determining, by the terminal device, a fourth moment of the first uplink message, the method further includes: receiving, by the terminal device, a response message that is of the first uplink message and that is sent by the network device, where the response message of the first uplink message includes the fourth moment, or the response message of the first uplink message includes a value of an offset between an expected moment of the fourth moment and the fourth moment.

In a possible design, the response message of the first uplink message includes the value of the offset between the expected moment of the fourth moment and the fourth moment; and the determining, by the terminal device, a fourth moment of the first uplink message includes: determining, by the terminal device, the fourth moment according to the following formula:

$T_4 = T_{4exp} + T_4$, where $T_{4exp}$ represents the expected moment of the fourth moment, $T_4$ represents the fourth moment, and $\Delta T_4$ represents the value of the offset between the expected moment of the fourth moment and the fourth moment.

In this embodiment of the present disclosure, it is avoided that the network device sends a complete fourth moment to the terminal device, and the network device only needs to send the value of the offset between the fourth moment and the expected moment of the fourth moment to the terminal device, so that the fourth moment of the first uplink message can be determined. This effectively reduces transmission overheads of the air interface.

In a possible design, before the determining, by the terminal device, a fourth moment of the first uplink message, the method further includes: determining, by the terminal device, the expected moment of the fourth moment according to the following formula:

$T_{4exp} = T + a \times t_1 + b \times t_2$, where

T represents the initial timestamp, a represents a frame number of the first uplink message, b represents a subframe number of the first uplink message, $t_1$ represents a time length of a frame, and $t_2$ represents a time length of a subframe.

In a possible design, before the determining, by the terminal device, a third moment of a first uplink message, the method further includes: sending, by the terminal device, a resource request message to the network device, where the request message is used to request the network device to allocate a resource location to the first uplink message; receiving, by the terminal device, response information that is of the resource request message and that is sent by the network device, where the response information of the resource request message includes uplink resource information of the first uplink message; and sending, by the terminal device, the first uplink message to the network device based on the uplink resource information.

In a possible design, the determining, by the terminal device, a time offset between the terminal device and the network device based on the first moment, the second moment, the third moment, and the fourth moment includes: determining, by the terminal device, the time offset according to the following formula:

$O = (T_1 - T_2 - T_3 + T_4)/2$, where

O represents the time offset, $T_1$ represents the first moment, $T_2$ represents the second moment, $T_3$ represents the third moment, and $T_4$ represents the fourth moment.

In a possible design, the terminal device adjusts a clock of the terminal device based on the time offset.

According to a second aspect, a time service method is provided, where the method includes:

determining, by a network device, a first moment of a first downlink message, where the first moment is a start moment of a time unit used by the network device to send the first downlink message;

generating, by the network device, a second message based on the first moment, where the second message includes the first moment, or the second message includes a value of an offset between an expected moment of the first moment and the first moment; and sending, by the network device, the second message to a terminal device.

In a possible design, before the determining, by a network device, a first moment of a first downlink message, the method further includes: sending, by the network device, cell time service information to the terminal device, where the cell granting information includes downlink resource information of the first downlink message; and sending, by the network device, the first downlink message to the terminal device based on the downlink resource information.

In a possible design, the sending, by the network device, cell time service information to the terminal device includes: broadcasting, by the network device, system information block SIB information to the terminal device, where the SIB information includes the cell time service information.

In a possible design, the second message includes the value of the offset between the expected moment of the first moment and the first moment; and the generating, by the network device, a second message based on the first moment includes: determining, by the network device, the value of the offset between the expected moment of the first moment and the first moment according to the following formula:

$$\Delta T_1 = T_1 - T_{1exp}, \text{ where}$$

$\Delta T_1$ represents the value of the offset between the expected moment of the first moment and the first moment, $T_1$ represents the first moment, and $T_{1exp}$ represents the expected moment of the first moment; and generating, by the network device, the second message, where the second message includes the value of the offset between the expected moment of the first moment and the first moment.

In a possible design, the method further includes: determining, by the network device, a fourth moment of a first uplink message, where the fourth moment is a start moment of a time unit used by the network device to receive the first uplink message; generating, by the network device, a response message of the first uplink message based on the fourth moment, where the response message of the first uplink message includes the fourth moment, or the response message of the first uplink message includes a value of an offset between an expected moment of the fourth moment and the fourth moment; and sending, by the network device, the response message of the first uplink message to the terminal device.

In a possible design, the determining, by the network device, a fourth moment of a first uplink message includes: determining, by the network device, a detection moment of the first uplink message, where the detection moment of the first uplink message is a start moment of receiving, by the network device, the first uplink message; determining, by the network device, a value of an offset between the detection moment of the first uplink message and the fourth moment; and determining, by the network device, the fourth moment according to the following formula:

$$T_4 = T_4' - \Delta t_u, \text{ where}$$

$T_4$ represents the fourth moment, $T_4'$ represents the detection moment of the first uplink message, and $\Delta t_u$ represents the value of the offset between the detection moment of the first uplink message and the fourth moment.

In a possible design, the generating, by the network device, a response message of the first uplink message based on the fourth moment includes: determining, by the network device, the value of the offset between the expected moment of the fourth moment and the fourth moment according to the following formula:

$$\Delta T_4 = T_4 - T_{4exp}, \text{ where}$$

$\Delta T_4$ represents the value of the offset between the expected moment of the fourth moment and the fourth moment, $T_4$ represents the fourth moment, and $T_{4exp}$ represents the expected moment of the fourth moment; and generating, by the network device, the response message of the first uplink message, where the response message of the first uplink message includes the value of the offset between the expected moment of the fourth moment and the fourth moment.

In a possible design, before the determining, by the network device, a fourth moment of a first uplink message, the method further includes: receiving, by the network device, a resource request message sent by the terminal device, where the request message is used to request the network device to allocate a resource location to the first uplink message; sending, by the network device, response information to the terminal device based on the resource request message, where the response information includes uplink resource information of the first uplink message; and receiving, by the network device based on the uplink resource information, the first uplink message sent by the terminal device.

According to a third aspect, a terminal device is provided, where the terminal device includes:

a first determining unit, configured to: determine a first moment of a first downlink message, and determine a second moment of the first downlink message, where the first moment is a start moment of a time unit used by a network device to send the first downlink message, and the second moment is a start moment of a time unit used by the terminal device to receive the first downlink message;

a second determining unit, configured to: determine a third moment of a first uplink message, and determine a fourth moment of the first uplink message, where the third moment is a start moment of a time unit used by the terminal device to send the first uplink message, and the fourth moment is a start moment of a time unit used by the network device to receive the first uplink message; and a third determining unit, configured to determine a time offset between the terminal device and the network device based on the first moment, the second moment, the third moment, and the fourth moment.

According to a fourth aspect, a terminal device is provided, where the terminal device includes a processor, and the processor is specifically configured to:

determine a first moment of a first downlink message, and determine a second moment of the first downlink message, where the first moment is a start moment of a time unit used by a network device to send the first downlink message, and the second moment is a start moment of a time unit used by the terminal device to receive the first downlink message;

determine a third moment of a first uplink message, and determine a fourth moment of the first uplink message, where the third moment is a start moment of a time unit used by the terminal device to send the first uplink message, and the fourth moment is a start moment of a time unit used by the network device to receive the first uplink message; and determine a time offset between the terminal device and the network device based on the first moment, the second moment, the third moment, and the fourth moment.

The terminal devices in the third aspect and the fourth aspect can implement the time service method performed by the terminal device in the method according to the first aspect.

According to a fifth aspect, a network device is provided, where the network device includes:

a processing unit, configured to: determine a first moment of a first downlink message, where the first moment is a start moment of a time unit used by the network device to send the first downlink message; and generate a second message based on the first moment, where the second message includes the first moment, or the second message includes a value of an offset between an expected moment of the first moment and the first moment; and a transceiver unit, configured to send the second message to a terminal device.

According to a sixth aspect, a network device is provided, where the network device includes:

a processor, configured to: determine a first moment of a first downlink message, where the first moment is a start moment of a time unit used by the network device to send the first downlink message; and generate a second message based on the first moment, where the second message includes the first moment, or the second message includes a value of an offset between an expected moment of the first moment and the first moment; and a transceiver, configured to send the second message to a terminal device.

The network devices in the fifth aspect and the sixth aspect can implement the time service method performed by the network device in the method according to the first aspect.

With reference to the foregoing aspects, in some possible designs, the first uplink message is a sounding reference signal SRS, or the first uplink message is a physical random access channel PRACH.

With reference to the foregoing aspects, the first downlink message is a cell-specific reference signal CRS.

DETAILED DESCRIPTION OF ILLUSTRATIVE EMBODIMENTS

The following describes technical solutions of this application with reference to accompanying drawings.

Figure 1:
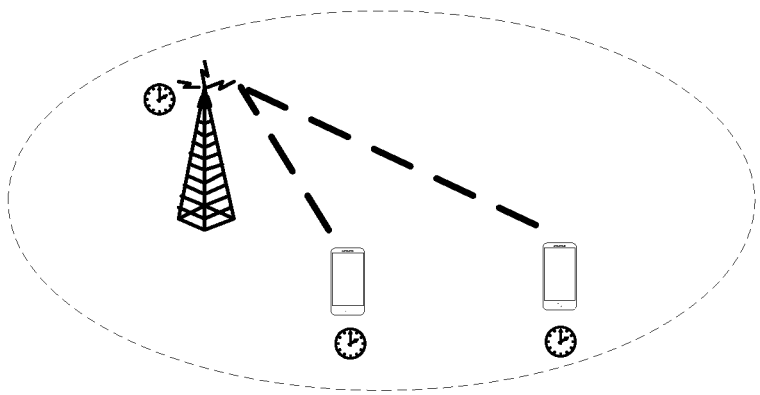
FIG. 1 is a schematic diagram of an example of a scenario to which embodiments of the present disclosure can be applied.

FIG. 1 is a schematic diagram of an application scenario of the embodiments of the present disclosure.

The embodiments of the present disclosure may be applied to a cellular network communications system in which a terminal needs a time service based on absolute time. The system may include at least one network device and at least one terminal device. Some or all of the at least one terminal device needs a time service based on absolute time. For example, as shown in FIG. 1, the embodiments of the present disclosure may be applied to a cellular network communications system including two terminal devices that need a time service based on absolute time.

It should be understood that the embodiments of the present disclosure are described by using a cellular network communications system as an example, but the present disclosure is not limited thereto. In other words, technical solutions of the embodiments of the present disclosure may be applied to various communications systems in which a terminal needs a time service based on absolute time, for example, a global system for mobile communications (Global System of Mobile communication, GSM) system, a code division multiple access (Code Division Multiple Access, CDMA) system, a wideband code division multiple access (Wideband Code Division Multiple Access, WCDMA) system, a general packet radio service (General Packet Radio Service, GPRS) system, a 5G communications system, a long term evolution (Long Term Evolution, LTE) system, an LTE frequency division duplex (Frequency Division Duplex, FDD) system, an LTE time division duplex (Time Division Duplex, TDD) system, a universal mobile telecommunications system (Universal Mobile Telecommunication system, UMTS), and the like.

The present disclosure describes the embodiments with reference to a network device and a terminal device. The terminal device includes but is not limited to user equipment (User Equipment, UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal device may communicate with one or more core networks through a radio access network. For example, the terminal device may be a cellular phone, a cordless phone, a session initiation protocol (Session Initiation Protocol, SIP) phone, a wireless local loop (Wireless Local Loop, WLL) station, a personal digital assistant (Personal Digital Assistant, PDA), a handheld device having a wireless communication function, a computing device or another processing device connected to a wireless modem, a vehicle-mounted device, a wearable device, a terminal device in a future 5G network, a terminal device in a future evolved PLMN network, or the like.

The network device may be a device configured to communicate with the terminal device, and the network device may be a base station or a network side device having a base station function. For example, the network device may be a base transceiver station (Base Transceiver Station, BTS) in the GSM system or the CDMA system, or may be a NodeB (NodeB, NB) in the WCDMA system, or may be an evolved NodeB (Evolved Node B, eNB or eNodeB) in the LTE system, or the network device may be a relay station, an access point, a vehicle-mounted device, a wearable device, a network side device in the future 5G network, or the like.

In the LTE system, downlink time synchronization is implemented by detecting a synchronization signal or a cell-specific reference signal. The terminal device detects a synchronization signal to implement frame boundary alignment of a received signal. Once the terminal device successfully gets access, the terminal device can perform time offset estimation and tracking on a received signal by using a cell-specific reference signal.

However, relative to a frame boundary of the received signal, the time offset estimation is mainly for data demodulation and belongs to relative time synchronization. A time service based on absolute time cannot be implemented for the terminal device. In addition, a delay in an uplink or downlink data transmission process is not considered, and a time service error exists.

For an uplink timing adjustment (Timing Adjustment, TA), the network device measures an uplink time offset based on a signal sent by the terminal, such as a physical random access channel (Physical Random Access Channel, PRACH), a demodulation reference signal (Demodulation Reference Signal, DMRS), or a sounding reference signal (Sounding Reference Signal, SRS), to obtain a time offset between a terminal signal received by the network device and a frame boundary, uses the time offset as a TA, and sends the TA to the terminal device for time adjustment.

However, in the LTE system, considering performance tolerance of data demodulation, a TA is quantized by using 16 Ts, and a quantization error exists. Therefore, absolute time synchronization with the network device cannot be implemented. In addition, a delay in an uplink or downlink data transmission process is not considered, and a time service error exists.

Therefore, an embodiment of the present disclosure provides a time service method. Uplink and downlink propagation delays are considered for the terminal device, and a time service based on absolute time can be provided for the terminal device by using a first moment and a second moment of a first downlink message and a third moment and a fourth moment of a first uplink message, thereby effectively reducing a time service error.

It should be noted that, in this embodiment of the present disclosure, a moment at which the first downlink message is detected may be different from a start moment of a time unit in which the first downlink message is located.

For example, the first downlink message may be a sequence mapped to a middle location of the time unit. When the terminal device receives the first downlink message, a recorded moment is a detection moment at which the first downlink message is detected rather than a start moment of a time unit used by the terminal device to receive the first downlink message.

It should be further noted that, to be close to an existing standard, when sending the first downlink message to the terminal device, the network device records a start moment of a time unit used to send the first downlink message. Similarly, when the terminal device sends the first uplink message to the network device, a start moment of a time unit used to send the first uplink message is recorded.

For ease of description, the following describes in detail physical meanings of various moments of the first downlink message and the first uplink message in this embodiment of the present disclosure.

The first moment is the start moment of the time unit used by the network device to send the first downlink message.

The second moment is the start moment of the time unit used by the terminal device to receive the first downlink message.

The detection moment of the first downlink message is a moment at which the terminal device detects the first downlink message.

The third moment is the start moment of the time unit used by the terminal device to send the first uplink message.

The fourth moment is a start moment of a time unit used by the network device to receive the first uplink message.

A detection moment of the first uplink message is a moment at which the network device detects the first uplink message.

In other words, in this embodiment of the present disclosure, the second moment may be different from the detection moment of the first downlink message. Similarly, in this embodiment of the present disclosure, the fourth moment may be different from the detection moment of the first uplink message.

In addition to moments related to the recorded moments of the first downlink message and the first uplink message, this embodiment of the present disclosure further involves an expected moment of the first moment and an expected moment of the fourth moment.

It should be understood that, if the first downlink message and the first uplink message are transmitted in a same radio frame cycle, and there is no error between radio frames in the cycle, an ideal moment at which the first downlink message arrives at a base station may be calculated by using a resource location of the first downlink message and an absolute moment of a start frame. In this embodiment of the present disclosure, the ideal moment at which the first downlink message arrives at the base station is defined as the expected moment of the first moment. Similarly, an ideal moment at which the first uplink message arrives at the base station is defined as the expected moment of the fourth moment.

Optionally, the first downlink message in this embodiment of the present disclosure is a cell-specific reference signal (Cell-specific Reference Signal, CRS) to reduce downlink signaling overheads.

Optionally, the first uplink message in this embodiment of the present disclosure is a sounding reference signal (Sounding Reference Signal, SRS), or the first uplink message is a physical random access channel (Physical Random Access Channel, PRACH) to reduce uplink signaling overheads.

It should be understood that a time unit in this embodiment of the present disclosure may be a unit time length to which the first downlink message or the first uplink message is mapped in time domain. A specific form of the time unit is not limited in this embodiment of the present disclosure.

For example, in the LTE system, when the first downlink message is a CRS, the time unit may be a frame.

It should be further understood that, in this embodiment of the present disclosure, terms "downlink" and "uplink" are used to indicate signal or data transmission directions. "Downlink" is used to indicate that a signal or data transmission direction is a direction from the network device to the terminal device, and "uplink" is used to indicate that the signal or data transmission direction is a direction from the terminal device to the network device. Terms "first moment", "second moment", "third moment", and "fourth moment" are merely used to distinguish between different moments, and a sequence, lengths, types, and the like of the times are not limited.

Optionally, after determining the first moment, the second moment, and the third moment, the terminal device may determine a time offset between the terminal device and the network device according to the following formula:

$$O=(T_1-T_2-T_3+T_4)/2 \qquad (1)$$

where O represents the time offset, $T_1$ represents the first moment, $T_2$ represents the second moment, $T_3$ represents the third moment, and $T_4$ represents the fourth moment.

Specifically, in this embodiment of the present disclosure, if an uplink delay and a downlink delay are symmetric, the following formulas may be obtained when the uplink and downlink propagation delays are considered:

$$T_2-T_1=\text{delay}-O \qquad (2) \text{ and}$$

$$T_4-T_3=\text{delay}+O \qquad (3)$$

where delay is a delay in uplink or downlink transmission. It can be learned that the formula (1) may be obtained through calculation by using the formula (2) and the formula (3).

It should be noted that, in this embodiment of the present disclosure, transmission of the first downlink message is based on the network device, and transmission of the first uplink message is based on the terminal device. In other words, a time reference of the formula (2) is a time of the network device, and a time reference of the formula (3) is a time of the terminal device.

Therefore, the time offset between the terminal device and the network device can be determined by using the formula (2) and the formula (3).

Therefore, according to the time service method provided in this embodiment of the present disclosure, the uplink and downlink propagation delays are considered for the terminal device, and a time service based on absolute time can be provided for the terminal device by using the first moment and the second moment of the first downlink message and the third moment and the fourth moment of the first uplink message, thereby effectively reducing a time service error.

Figure 2:
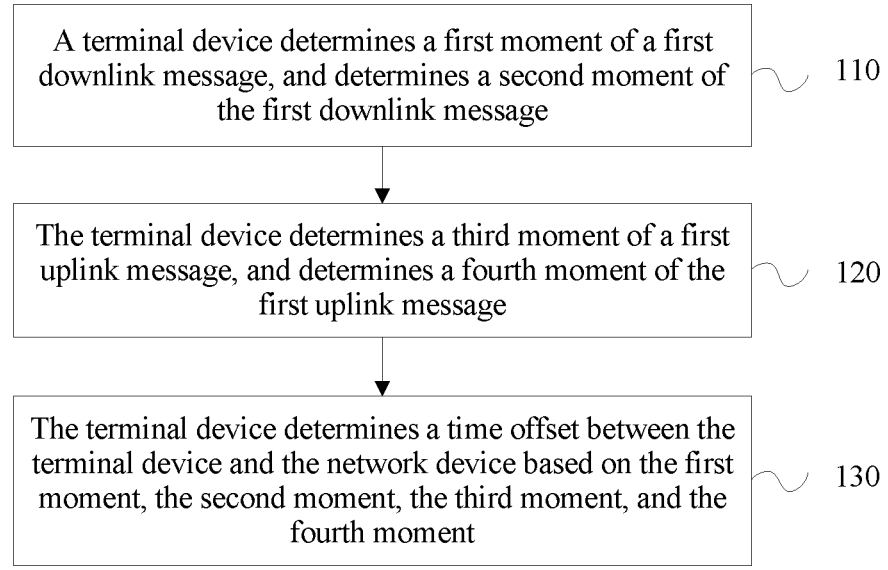
FIG. 2 is a schematic flowchart of a time service method according to an embodiment of the present disclosure.
Figure 3:
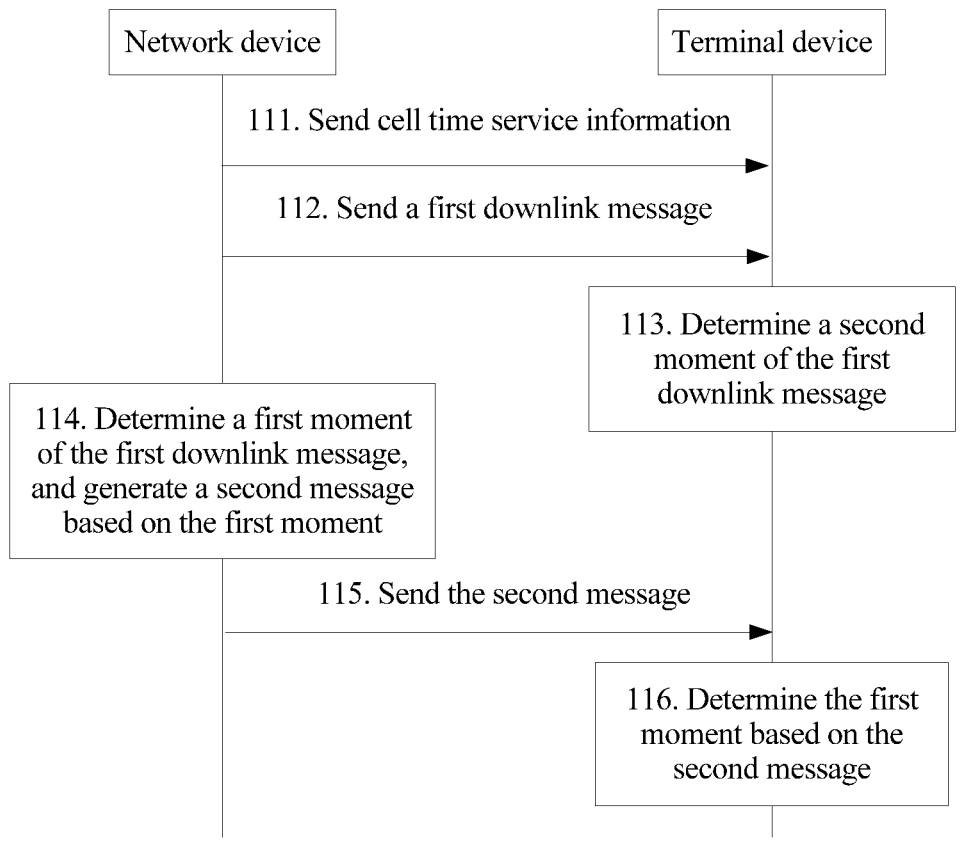
FIG. 3 is a schematic flowchart of a method for determining, by a terminal device, a first moment and a second moment according to an embodiment of the present disclosure.
Figure 4:
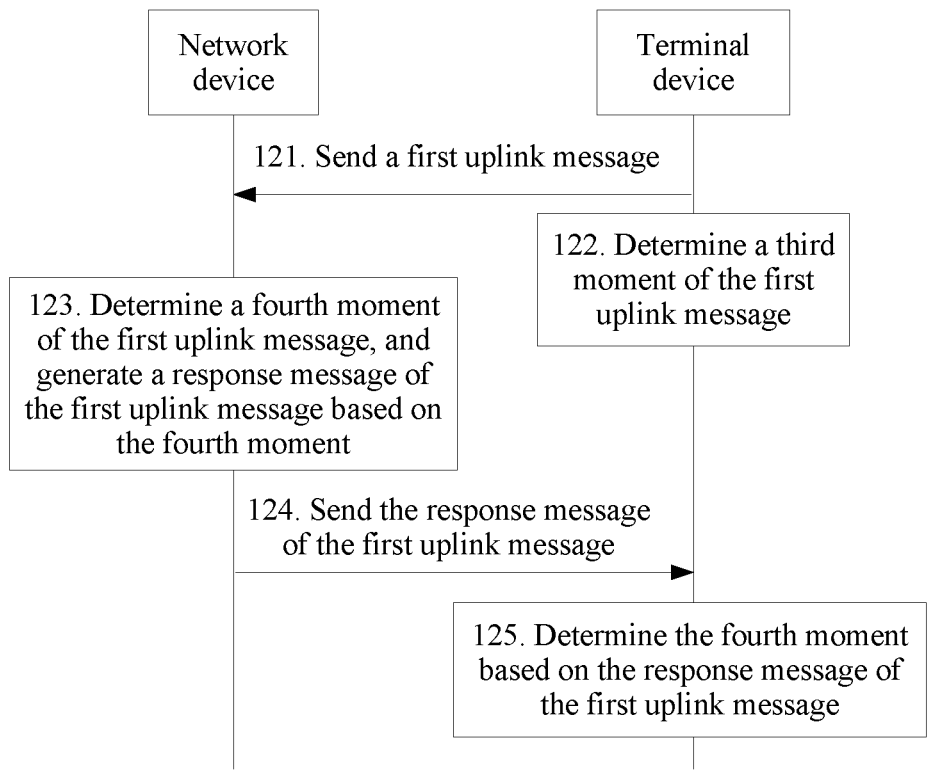
FIG. 4 is a schematic flowchart of a method for determining, by a terminal device, a third moment and a fourth moment according to an embodiment of the present disclosure.

The following describes, with reference to FIG. 2 to FIG. 4, specific implementations of determining, by the terminal device, the moments.

FIG. 2 is a schematic flowchart of a time service method 100 according to an embodiment of the present disclosure. As shown in FIG. 1, the method 100 includes the following steps.

110. A terminal device determines a first moment of a first downlink message, and determines a second moment of the first downlink message.

Specifically, the terminal device determines the first moment of the first downlink message, and determines the second moment of the first downlink message, where the first moment is a start moment of a time unit used by a network device to send the first downlink message, and the second moment is a start moment of a time unit used by the terminal device to receive the first downlink message.

FIG. 2 is a schematic flowchart of a method for determining, by the terminal device, the first moment and the second moment in this embodiment of the present disclosure.

The following describes, with reference to FIG. 2, a specific implementation of determining, by the terminal device, the first moment and the second moment.

Optionally, as shown in FIG. 2, step 110 includes the following steps.

111. Send cell time service information.

Specifically, the network device sends the cell time service information to the terminal device, where the cell time service information includes downlink resource information of the first downlink message. In other words, the terminal device receives the cell time service information sent by the network device, to receive the first downlink message.

Optionally, the terminal device receives system information block SIB information broadcast by the network device, where the SIB information includes the cell time service information.

Optionally, the downlink resource information includes information about the first downlink message, such as a resource location, a resource period, a subframe number, a quantity of bits in a mask of a frame number (different masks correspond to different periods), a value of a masked frame number, and a base station clock precision level.

112. Send the first downlink message.

Specifically, the network device sends the first downlink message to the terminal device based on the downlink resource information. In other words, the terminal device may receive, based on the downlink resource information, the first downlink message sent by the network device.

113. Determine the second moment of the first downlink message.

Specifically, the terminal device may determine a detection moment of the first downlink message by detecting the first downlink message, and determine the first moment based on the detection moment of the first downlink message.

Optionally, the terminal device determines the detection moment of the first downlink message, where the detection moment of the first downlink message is a start moment of receiving, by the terminal device, the first downlink message. The terminal device determines a value of an offset between the detection moment of the first downlink message and the second moment. The terminal device determines the second moment according to the following formula:

$$T_2=T_2'-\Delta t_d \qquad (4)$$

where $T_2$ represents the second moment, $T_2'$ represents the detection moment of the first downlink message, and $\Delta t_d$ represents the value of the offset between the detection moment of the first downlink message and the second moment.

Specifically, the terminal obtains the detection moment of the first downlink message based on a subframe that is specified for the first downlink message in the cell time service information. Optionally, there is a fixed time offset $\Delta t_d$ between the detection moment of the first downlink message and the second moment. The terminal device determines the second moment according to the formula (4).

The following describes, with reference to step 114 to step 117 in FIG. 3, a specific implementation of determining, by the terminal device, the first moment.

114. Determine the first moment of the first downlink message, and generate a second message based on the first moment.

Specifically, the network device may record the first moment of the first downlink message when sending the first downlink message to the terminal device.

In other words, the network device may generate the second message based on the first moment. The second message may include the first moment, or the second message may include time information used by the terminal device to determine the first moment.

115. Send the second message.

The network device sends the second message to the terminal device, so that the terminal device determines the first moment of the first downlink message based on information in the second message.

116. Determine the first moment based on the second message.

Specifically, the terminal device receives the second message sent by the network device, and determines the first moment of the first downlink message based on the information in the second message.

Optionally, the cell time service information further includes a multicast-radio network temporary identifier TG-RNTI of the second message. The terminal device receives, based on the TG-RNTI, the second message sent by the network device, where the second message includes the first moment.

Specifically, the network device sends the first downlink message on the resource location that is of the first downlink message and that is indicated in the cell time service information, and records the first moment. After broadcasting the first downlink message, the network device broadcasts or multicasts the second message to a terminal device that needs a time service. The second message carries the first moment. The terminal device receives the second message and obtains the first moment.

Optionally, the cell granting information further includes an initial timestamp of the network device, and the initial timestamp is a start moment corresponding to an initial time unit of a frame period. In other words, after determining the initial timestamp of the first downlink message, the terminal device can accurately calculate an expected moment of the first moment.

Specifically, the terminal device determines the expected moment of the first moment based on the initial timestamp of the first downlink message, so that the terminal device determines the first moment based on the expected moment of the first moment.

Optionally, the terminal device determines the expected moment of the first moment based on the start absolute time and according to the following formula, and the terminal device determines the first moment based on the expected moment of the first moment:

$$T_{1exp}=T+n \times t_1+m \times t_2 \qquad (5)$$

where $T_{1exp}$ represents the expected moment of the first moment, T represents the initial timestamp, n represents a frame number of the first downlink message, m represents a subframe number of the first downlink message, $t_1$ represents a time length of a frame, and $t_2$ represents a time length of a subframe.

Optionally, in an LTE system, the initial timestamp may be a start absolute time of a subframe #0 in a frame #0.

It should be understood that specific values of $t_1$ and $t_2$ are not limited in this embodiment of the present disclosure. For example, in the long term evolution system, $t_1=10$ ms, $t_2=1$ ms, and $T_{1exp}=T+$(frame number×10 ms)+(subframe number×1 ms). For another example, in a frame structure that may appear in the future, a time length of a frame is 20 ms, and a time length of a subframe is 5 ms. Then, in this embodiment of the present disclosure, $t_1=20$ ms, and $t_2=5$ ms.

In an embodiment, the cell time service information further includes a multicast-radio network temporary identifier TG-RNTI of the second message. The terminal device receives, based on the TG-RNTI, the second message sent by the network device, where the second message includes a value of an offset between the first moment and the expected moment of the first moment. The terminal device determines the first moment based on the expected moment of the first moment and according to the following formula:

$$T_1=T_{1exp}+\Delta T_1 \qquad (6)$$

where $T_1$ represents the first moment, and $\Delta T_1$ represents the value of the offset between the first moment and the expected moment of the first moment.

In other words, the network device may alternatively deduce the expected moment of the first moment based on the initial timestamp of the first downlink message and according to the formula (5), then determine the value of the offset ($\Delta T_1$) between $T_{1exp}$ and $T_1$, and finally, send $\Delta T_1$ to the terminal device in a form of the second message.

In this embodiment of the present disclosure, it is avoided that the network device sends the complete $T_1$ to the terminal device, and the network device only needs to send $\Delta T_1$ to the terminal device, so that the first moment of the first downlink message can be determined. This effectively reduces transmission overheads of an air interface.

To further reduce information exchange between the network device and the terminal device, it is avoided that the network device sends the second message to the terminal device.

Optionally, the terminal device determines the expected moment of the first moment as the first moment.

It should be understood that FIG. 3 merely describes, by way of example, the method for determining, by the terminal device, the first moment and the second moment, and this embodiment of the present disclosure is not limited thereto.

For example, the second message may alternatively include only index information. The terminal device determines the first moment based on the index information, or determines the value of the offset between the first moment and the expected moment of the first moment based on the index information, or the like.

As shown in FIG. 2, the time service method 100 in this embodiment of the present disclosure further includes the following step.

120. The terminal device determines a third moment of a first uplink message, and determines a fourth moment of the first uplink message.

Specifically, the terminal device determines the third moment of the first uplink message, and determines the fourth moment of the first uplink message, where the third moment is a start moment of a time unit used by the terminal device to send the first uplink message, and the fourth moment is a start moment of a time unit used by the network device to receive the first uplink message.

FIG. 4 is a schematic flowchart of a method for determining, by the terminal device, the third moment and the fourth moment in this embodiment of the present disclosure.

Optionally, as shown in FIG. 4, step 120 includes the following steps.

121. Send the first uplink message.

Specifically, the terminal device sends the first uplink message to the network device.

Optionally, before step 121, the network device receives a resource request message sent by the terminal device, where the request message is used to request the network device to allocate a resource location to the first uplink message. The network device sends response information to the terminal device based on the resource request message, where the response information includes uplink resource information of the first uplink message. The network device receives, based on the uplink resource information, the first uplink message sent by the terminal device.

122. Determine the third moment of the first uplink message.

Specifically, for the first uplink message, the terminal device sends the first uplink message on an uplink resource indicated in the response message of the resource request message, and records a sending moment, namely, the third moment.

In other words, the terminal device can record the third moment of the first uplink message when sending the first uplink message, and the terminal device only needs to determine the fourth moment of the first uplink message.

123. Determine the fourth moment of the first uplink message, and generate a response message of the first uplink message based on the fourth moment.

Specifically, the network device determines the fourth moment of the first uplink message, and generates the response message of the first uplink message based on the fourth moment, so that the terminal device can determine the fourth moment based on the received response message of the first uplink message.

Specifically, the network device determines a detection moment of the first uplink message and a value of an offset between the detection moment of the first uplink message and the fourth moment, and determines the fourth moment according to the following formula (7):

$$T_4 = T_4' - \Delta t_u \qquad (7)$$

where $T_4$ represents the fourth moment, $T_4'$ represents the detection moment of the first uplink message, and $\Delta t_u$ represents the value of the offset between the detection moment of the first uplink message and the fourth moment.

Optionally, the response message of the first uplink message includes the fourth moment, or the response message of the first uplink message includes a value of an offset between an expected moment of the fourth moment and the fourth moment.

Specifically, the network device sends the fourth moment or the value of the offset between the expected moment of the fourth moment and the fourth moment to the terminal device in a form of the response message of the first uplink message.

Optionally, the response message of the first uplink message includes the fourth moment.

Specifically, the network device listens to the first uplink message, records the detection moment of the fourth moment of the first uplink message, and determines the fourth moment based on the detection moment of the fourth moment. The network device sends the response message of the first uplink message to the terminal device, where the response message of the first uplink message carries the fourth moment. The terminal device receives the response message of the first uplink message, and learns the fourth moment.

Optionally, the response message of the first uplink message includes the value of the offset between the expected moment of the fourth moment and the fourth moment.

Specifically, the network device may determine the expected moment of the fourth moment according to the following formula (8), and determine the value of the offset between the expected moment of the fourth moment and the fourth moment according to the following formula (9):

$$T_{4exp} = T + a \times t_1 + b \times t_2 \qquad (8) \text{ and}$$

$$\Delta T_4 = T_4 - T_{4exp} \qquad (9)$$

where T represents the initial timestamp, a represents a frame number of the first uplink message, b represents a subframe number of the first uplink message, $t_1$ represents a time length of a frame, and $t_2$ represents a time length of a subframe; $\Delta T_4$ represents the value of the offset between the expected moment of the fourth moment and the fourth moment, $T_4$ represents the fourth moment, and $T_{4exp}$ represents the expected moment of the fourth moment.

In other words, when receiving the response message that includes the value of the offset between the expected moment of the fourth moment and the fourth moment, the terminal device may determine the expected moment of the fourth moment according to the formula (8), and determine the fourth moment according to the following formula (10):

$$T_4 = T_{4exp} + T_4 \qquad (10)$$

It should be understood that, in this embodiment of the present disclosure, the initial timestamp corresponding to the first downlink message is equal to the initial timestamp corresponding to the first uplink message, but this embodiment of the present disclosure is not limited there to. For example, the first downlink message and the first uplink message may be carried in different radio frame periods. In other words, the initial timestamp corresponding to the first downlink message may be unequal to the initial timestamp corresponding to the first uplink message.

124. Send the response message of the first uplink message.

Specifically, the network device sends the response message of the first uplink message to the terminal device.

125. Determine the fourth moment based on the response message of the first uplink message.

Specifically, the network device sends the response message of the first uplink message to the terminal device, and the terminal device determines the fourth moment based on the received response message of the first uplink message.

It should be understood that FIG. 3 merely describes, by way of example, the method for determining, by the terminal device, the third moment and the fourth moment, and this embodiment of the present disclosure is not limited thereto.

For example, the response message of the first uplink message may alternatively include only index information. The terminal device determines the fourth moment based on the index information, or determines the value of the offset between the fourth moment and the expected time of the fourth moment based on the index information, or the like.

As shown in FIG. 2, the time service method 100 in this embodiment of the present disclosure further includes the following step.

130. The terminal device determines a time offset between the terminal device and the network device based on the first moment, the second moment, the third moment, and the fourth moment.

Specifically, the terminal device can determine the time offset between the terminal device and the network device after determining the first moment, the second moment, the third moment, and the fourth moment.

Optionally, the terminal device adjusts a clock of the terminal device based on the time offset.

It should be understood that sequence numbers in FIG. 2 to FIG. 4 are merely an example. The sequence numbers of the foregoing processes do not mean execution sequences. The execution sequences of the processes should be determined based on functions and internal logic of the processes, and should not be construed as any limitation on the implementation processes of the embodiments of the present disclosure.

The foregoing describes the time service method in the embodiment of the present disclosure with reference to FIG. 2 to FIG. 4. The following describes a terminal device and a network device in the embodiments of the present disclosure with reference to FIG. 5 to FIG. 8.

Figure 5:
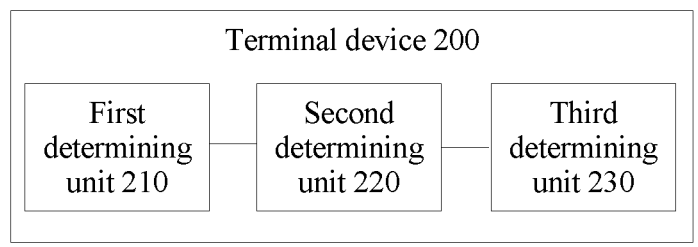
FIG. 5 is a schematic block diagram of a terminal device according to an embodiment of the present disclosure.

FIG. 5 is a schematic block diagram of a time service terminal device according to an embodiment of the present disclosure.

As shown in FIG. 5, the terminal device 200 includes:

a first determining unit 210, configured to: determine a first moment of a first downlink message, and determine a second moment of the first downlink message, where the first moment is a start moment of a time unit used by a network device to send the first downlink message, and the second moment is a start moment of a time unit used by the terminal device to receive the first downlink message;

a second determining unit 220, configured to: determine a third moment of a first uplink message, and determine a fourth moment of the first uplink message, where the third moment is a start moment of a time unit used by the terminal device to send the first uplink message, and the fourth moment is a start moment of a time unit used by the network device to receive the first uplink message; and a third determining unit 230, configured to determine a time offset between the terminal device and the network device based on the first moment, the second moment, the third moment, and the fourth moment.

According to the time service method provided in this embodiment of the present disclosure, uplink and downlink propagation delays are considered for the terminal device, and a time service based on absolute time can be provided for the terminal device by using the first moment and the second moment of the first downlink message and the third moment and the fourth moment of the first uplink message, thereby effectively reducing a time service error.

Optionally, the terminal device 200 further includes:

a transceiver unit, configured to: before the terminal device determines the first moment and the second moment of the first downlink message, receive cell time service information sent by the network device, where the cell time service information includes downlink resource information of the first downlink message; and receive, based on the downlink resource information, the first downlink message sent by the network device.

Optionally, the transceiver unit is specifically configured to receive system information block SIB information broadcast by the network device, where the SIB information includes the cell time service information.

Optionally, the cell time service information further includes a multicast-radio network temporary identifier TG-RNTI of a second message, and the first determining unit 210 is specifically configured to receive, based on the TG-RNTI, the second message sent by the network device, where the second message includes the first moment.

Optionally, the cell granting information further includes an initial timestamp of the network device, and the initial timestamp is a start moment corresponding to an initial time unit of a frame period.

Optionally, the first determining unit 210 is specifically configured to: determine an expected moment of the first moment based on the start absolute time and according to the following formula (11); and determine the first moment based on the expected moment of the first moment:

$$T_{1exp}=T+n\times t_1+m\times t_2 \quad (11), \text{ where}$$

$T_{1exp}$ represents the expected moment of the first moment, T represents the initial timestamp, n represents a frame number of the first downlink message, m represents a subframe number of the first downlink message, $t_1$ represents a time length of a frame, and $t_2$ represents a time length of a subframe.

Optionally, the cell time service information further includes a multicast-radio network temporary identifier TG-RNTI of a second message, and the first determining unit 210 is specifically configured to: receive, based on the TG-RNTI, the second message sent by the network device, where the second message includes a value of an offset between the first moment and the expected moment of the first moment; and determine the first moment based on the expected moment of the first moment and according to the following formula (12):

$$T_1=T_{1exp}+\Delta T_1 \quad (12), \text{ where}$$

$T_1$ represents the first moment, and $\Delta T_1$ represents the value of the offset between the first moment and the expected moment of the first moment.

In this embodiment of the present disclosure, it is avoided that the network device sends a complete first moment to the terminal device, and the network device only needs to send the value of the offset between the first moment and the expected moment of the first moment to the terminal device, so that the first moment of the first downlink message can be determined. This effectively reduces transmission overheads of an air interface.

Optionally, the first determining unit 210 is specifically configured to determine the expected moment of the first moment as the first moment.

In this embodiment of the present disclosure, to further reduce information exchange between the network device and the terminal device, it is avoided that the network device sends the second message to the terminal device.

Optionally, the second determining unit 220 is specifically configured to: determine a detection moment of the first downlink message, where the detection moment of the first downlink message is a start moment of receiving, by the terminal device, the first downlink message; determine a value of an offset between the detection moment of the first downlink message and the second moment; and determine the second moment according to the following formula (13):

$$T_2=T_2'-\Delta t_d \quad (13), \text{ where}$$

$T_2$ represents the second moment, $T_2'$ represents the detection moment of the first downlink message, and $\Delta t_d$ represents the value of the offset between the detection moment of the first downlink message and the second moment.

Optionally, the transceiver unit is further configured to receive a response message that is of the first uplink message and that is sent by the network device, where the response message of the first uplink message includes the fourth moment, or the response message of the first uplink message includes a value of an offset between an expected moment of the fourth moment and the fourth moment.

Optionally, the response message of the first uplink message includes the value of the offset between the expected moment of the fourth moment and the fourth moment, and the second determining unit 220 is specifically configured to determine the fourth moment according to the following formula (14):

$$T_4=T_{4exp}+\Delta T_4 \quad (14), \text{ where}$$

$T_{4exp}$ represents the expected moment of the fourth moment, $T_4$ represents the fourth moment, and $\Delta T_4$ represents the value of the offset between the expected moment of the fourth moment and the fourth moment.

In this embodiment of the present disclosure, it is avoided that the network device sends a complete fourth moment to the terminal device, and the network device only needs to send the value of the offset between the fourth moment and the expected moment of the fourth moment to the terminal device, so that the fourth moment of the first uplink message can be determined. This effectively reduces transmission overheads of the air interface.

Optionally, before the second determining unit 220 determines the fourth moment, the second determining unit 220 is specifically configured to determine the expected moment of the fourth moment according to the following formula (15):

$$T_{4exp}=T+a\times t+b\times t_2 \quad (15), \text{ where}$$

T represents the initial timestamp, a represents a frame number of the first uplink message, b represents a subframe number of the first uplink message, $t_1$ represents a time length of a frame, and $t_2$ represents a time length of a subframe.

Optionally, before the second determining unit 220 determines the third moment of the first uplink message, the transceiver unit is further configured to: send a resource request message to the network device, where the request message is used to request the network device to allocate a resource location to the first uplink message; receive response information that is of the resource request message and that is sent by the network device, where the response information of the resource request message includes uplink resource information of the first uplink message; and send the first uplink message to the network device based on the uplink resource information.

Optionally, the third determining unit 230 is specifically configured to determine the time offset according to the following formula (16):

$$O=(T_1-T_2-T_3+T_4)/2 \qquad (16), \text{where}$$

O represents the time offset, $T_1$ represents the first moment, $T_2$ represents the second moment, $T_3$ represents the third moment, and $T_4$ represents the fourth moment.

Optionally, the terminal device further includes a setting unit, configured to adjust a clock of the terminal device based on the time offset.

Figure 6:
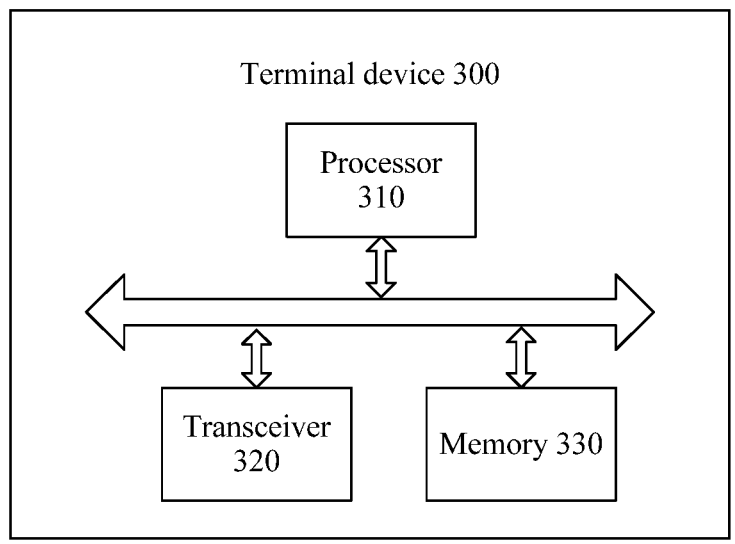
FIG. 6 is another schematic block diagram of a terminal device according to an embodiment of the present disclosure.

It should be noted that, in this embodiment of the present disclosure, the first determining unit 210, the second determining unit 220, and the third determining unit 230 all may be implemented by using a processor. As shown in FIG. 6, a terminal device 300 may include a processor 310, a transceiver 320, and a memory 330. The memory 330 may be configured to store indication information, and may be further configured to store code, an instruction, and the like executed by the processor 310. Components of the terminal device 300 are connected by using a bus system. In addition to a data bus, the bus system includes a power bus, a control bus, and a status signal bus.

The terminal device 300 shown in FIG. 6 can implement the processes implemented by the terminal device in the method embodiment of FIG. 2 to FIG. 4. To avoid repetition, details are not described herein again.

Figure 7:
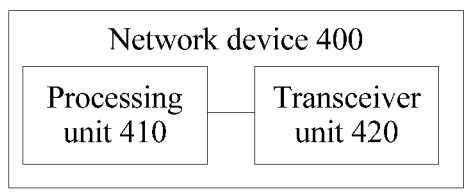
FIG. 7 is a schematic block diagram of a network device according to an embodiment of the present disclosure.

FIG. 7 is a schematic block diagram of a network device according to an embodiment of the present disclosure.

As shown in FIG. 7, the network device 400 includes:

a processing unit 410, configured to: determine a first moment of a first downlink message, where the first moment is a start moment of a time unit used by the network device to send the first downlink message; and generate a second message based on the first moment, where the second message includes the first moment, or the second message includes a value of an offset between an expected moment of the first moment and the first moment; and a transceiver unit 420, configured to send the second message to a terminal device.

Optionally, before the processing unit 410 determines the first moment of the first downlink message, the transceiver unit 420 is further configured to: send cell time service information to the terminal device, where the cell granting information includes downlink resource information of the first downlink message; and send the first downlink message to the terminal device based on the downlink resource information.

Optionally, the transceiver unit 420 is specifically configured to broadcast system information block SIB information to the terminal device, where the SIB information includes the cell time service information.

Optionally, the second message includes the value of the offset between the expected moment of the first moment and the first moment. The processing unit 410 is specifically configured to: determine the value of the offset between the expected moment of the first moment and the first moment according to the following formula (17); and generate the second message, where the second message includes the value of the offset between the expected moment of the first moment and the first moment:

$$\Delta T_1 = T_1 - T_{1exp} \qquad (17), \text{where}$$

$\Delta T_1$ represents the value of the offset between the expected moment of the first moment and the first moment, $T_1$ represents the first moment, and $T_{1exp}$ represents the expected moment of the first moment.

Optionally, the processing unit 410 is further configured to: determine a fourth moment of a first uplink message, where the fourth moment is a start moment of a time unit used by the network device to receive the first uplink message; and generate a response message of the first uplink message based on the fourth moment, where the response message of the first uplink message includes the fourth moment, or the response message of the first uplink message includes a value of an offset between an expected moment of the fourth moment and the fourth moment; and the transceiver unit 420 is further configured to send the response message of the first uplink message to the terminal device.

Optionally, the processing unit 410 is specifically configured to: determine a detection moment of the first uplink message, where the detection moment of the first uplink message is a start moment of receiving, by the terminal device, the first uplink message; determine a value of an offset between the detection moment of the first uplink message and the fourth moment; and determine the fourth moment according to the following formula (18):

$$T_4 = T_4' - \Delta t_u \qquad (18), \text{where}$$

$T_4$ represents the fourth moment, $T_4'$ represents the detection moment of the first uplink message, and $\Delta t_u$ represents the value of the offset between the detection moment of the first uplink message and the fourth moment.

Optionally, the processing unit 410 is specifically configured to: determine the value of the offset between the expected moment of the fourth moment and the fourth moment according to the following formula (19); the network device generates a response message of the first uplink message, where the response message of the first uplink message includes the value of the offset between the expected moment of the fourth moment and the fourth moment:

$$\Delta T_4 = T_4 - T_{4exp} \qquad (19), \text{where}$$

$\Delta T_4$ represents the value of the offset between the expected moment of the fourth moment and the fourth moment, $T_4$ represents the fourth moment, and $T_{4exp}$ represents the expected moment of the fourth moment.

Optionally, before the processing unit 410 determines the fourth moment of the first uplink message, the transceiver unit 420 is further configured to: receive a resource request message sent by the terminal device, where the request message is used to request the network device to allocate a resource location to the first uplink message; send response information to the terminal device based on the resource request message, where the response information includes uplink resource information of the first uplink message; and receive, based on the uplink resource information, the first uplink message sent by the terminal device.

It should be noted that in this embodiment of the present disclosure, the processing unit 410 may be implemented by a processor. As shown in FIG. 6, a network device 500 may include a processor 510, a transceiver 520, and a memory 530. The memory 530 may be configured to store indication information, and may be further configured to store code, an instruction, and the like executed by the processor 510. Components of the network device 500 are connected by using a bus system. In addition to a data bus, the bus system includes a power bus, a control bus, and a status signal bus.

Figure 8:
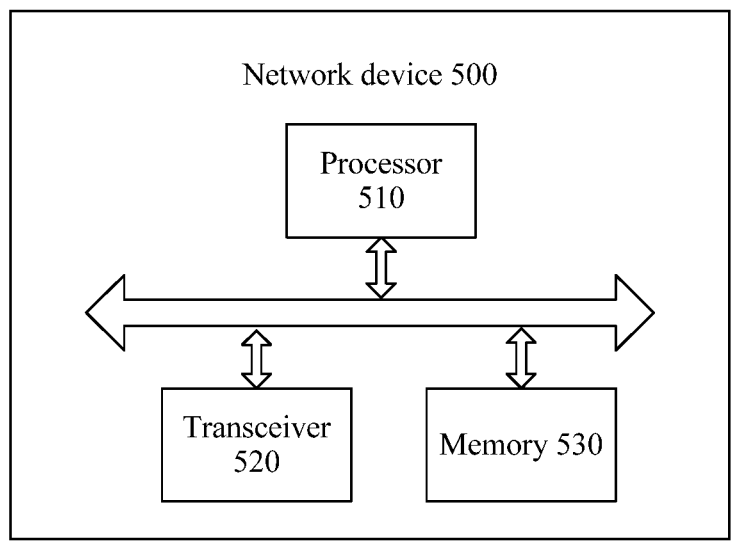
FIG. 8 is another schematic block diagram of a network device according to an embodiment of the present disclosure.

The network device 500 shown in FIG. 8 can implement the processes implemented by the network device in the method embodiment of FIG. 2 to FIG. 4. To avoid repetition, details are not described herein again.

It should be further understood that terms used in the embodiments and the appended claims of the present disclosure are merely used to describe specific embodiments rather than limiting the embodiments of the present disclosure.

For example, the term "and/or" in the embodiments of the present disclosure describes only an association relationship for describing associated objects and represents that three relationships may exist. Specifically, A and/or B may represent the following three cases: Only A exists, both A and B exist, and only B exists. In addition, the character "/" in this specification generally indicates an "or" relationship between the associated objects.

For another example, the terms "a", "the", and "this" of singular forms used in the embodiments and the appended claims of the present disclosure are also intended to include plural forms, unless otherwise specified in the context clearly.

A person of ordinary skill in the art may be aware that units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the embodiments of the present disclosure.

It may be clearly understood by a person skilled in the art that, for the purpose of convenient and brief description, for a detailed working process of the foregoing system, apparatus, and unit, reference may be made to a corresponding process in the foregoing method embodiment, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the embodiments of the present disclosure. In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the embodiments of the present disclosure essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present disclosure. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing content is merely specific implementations of the embodiments of the present disclosure, but the protection scope of the embodiments of the present disclosure is not limited thereto. Any variation or replacement readily figured out by a person skilled in the art within the technical scope disclosed in the embodiments of the present disclosure shall fall within the protection scope of the embodiments of the present disclosure. Therefore, the protection scope of the embodiments of present disclosure shall be subject to the protection scope of the claims.

What is claimed is:

1. A time service method comprising:
   determining, by a terminal device, a first moment of a first downlink message, and determining a second moment of the first downlink message, the first moment being a start moment of a time unit used by a network device to send the first downlink message, and the second moment being a start moment of a time unit used by the terminal device to receive the first downlink message; the determining the first moment comprising determining, by the terminal device, an expected moment of the first moment based on an initial timestamp of the network device and according to the following formula:

$$T_{1exp} = T + n \times t_1 + m \times t_2, \text{ wherein}$$

$T_{1exp}$ represents the expected moment of the first moment, T represents the initial timestamp, n represents a frame number of the first downlink message, m represents a subframe number of the first downlink message, $t_1$ represents a time length of a frame, and $t_2$ represents a time length of a subframe;

determining, by the terminal device, a third moment of a first uplink message, and determining a fourth moment of the first uplink message, the third moment being a start moment of a time unit used by the terminal device to send the first uplink message, and the fourth moment being a start moment of a time unit used by the network device to receive the first uplink message; and determining, by the terminal device, a time offset between the terminal device and the network device based on the first moment, the second moment, the third moment, and the fourth moment.

2. The method according to claim 1, wherein, before the determining, by the terminal device, the first moment of the first downlink message, the method further comprises:
receiving, by the terminal device, cell time service information sent by the network device, the cell time service information comprising downlink resource information of the first downlink message; and
receiving, by the terminal device based on the downlink resource information, the first downlink message sent by the network device.

3. The method according to claim 2, wherein the receiving, by the terminal device, the cell time service information sent by the network device comprises:
receiving, by the terminal device, system information block (SIB) information broadcast by the network device, the SIB information comprising the cell time service information.

4. The method according to claim 2, wherein the cell time service information further comprises a temporary group network temporary identifier (TG-RNTI) of a second message; and
the determining, by the terminal device, the first moment of the first downlink message comprises:
receiving, by the terminal device based on the TG-RNTI, the second message sent by the network device, the second message comprising the first moment.

5. The method according to claim 2, wherein the cell time service information further comprises the initial timestamp of the network device, and the initial timestamp is a start moment corresponding to an initial time unit of a frame period.

6. The method according to claim 5, wherein the cell time service information further comprises a temporary group network temporary identifier (TG-RNTI) of a second message; and
the determining, by the terminal device, the first moment further comprises:
receiving, by the terminal device based on the TG-RNTI, the second message sent by the network device, the second message comprising a value of an offset between the first moment and the expected moment of the first moment; and
determining, by the terminal device, the first moment according to the following formula:

$T_1 = T_{1exp} + \Delta T_1$, wherein $T_1$ represents the first moment, and $\Delta T_1$ represents the value of the offset between the first moment and the expected moment of the first moment.

7. The method according to claim 5, wherein the determining, by the terminal device, the first moment comprises:
determining, by the terminal device, the expected moment of the first moment as the first moment.

8. The method according to claim 1, wherein determining the second moment is based on a detection moment of the first downlink message, and the detection moment of the first downlink message is a start moment of receiving, by the terminal device, the first downlink message, and the determining, by the terminal device, the second moment of the first downlink message comprises:

determining, by the terminal device, a value of an offset between the detection moment of the first downlink message and the second moment; and
determining, by the terminal device, the second moment according to the following formula:

$T_2 = T_2' - \Delta t_d$, wherein $T_2$ represents the second moment, $T_2'$ represents the detection moment of the first downlink message, and $\Delta t_d$ represents the value of the offset between the detection moment of the first downlink message and the second moment.

9. The method according to claim 8, wherein before the determining, by the terminal device, the fourth moment of the first uplink message, the method further comprises:
receiving, by the terminal device, a response message that is of the first uplink message and that is sent by the network device,
the response message of the first uplink message comprising the fourth moment, or the response message of the first uplink message comprises a value of an offset between an expected moment of the fourth moment and the fourth moment.

10. The method according to claim 9, wherein the response message of the first uplink message comprises the value of the offset between the expected moment of the fourth moment and the fourth moment; and
the determining, by the terminal device, the fourth moment of the first uplink message comprises:
determining, by the terminal device, the fourth moment according to the following formula:

$T_4 = T_{4exp} + \Delta T_4$, wherein $T_{4exp}$ represents the expected moment of the fourth moment, $T_4$ represents the fourth moment, and $\Delta T_4$ represents the value of the offset between the expected moment of the fourth moment and the fourth moment.

11. The method according to claim 9, wherein before the determining, by the terminal device, the fourth moment of the first uplink message, the method further comprises:
determining, by the terminal device, the expected moment of the fourth moment according to the following formula:

$T_{4exp} = T + a \times t_1 + b \times t_2$, wherein

T represents the initial timestamp, a represents a frame number of the first uplink message, b represents a subframe number of the first uplink message, $t_1$ represents the time length of a frame, and $t_2$ represents the time length of a subframe.

12. The method according to claim 1, wherein before the determining, by the terminal device, the third moment of the first uplink message, the method further comprises:
sending, by the terminal device, a resource request message to the network device, the resource request message being used to request the network device to allocate a resource location to the first uplink message;
receiving, by the terminal device, response information that is of the resource request message and that is sent by the network device, the response information of the resource request message comprising uplink resource information of the first uplink message; and
sending, by the terminal device, the first uplink message to the network device based on the uplink resource information.

13. The method according to claim 1, wherein the determining, by the terminal device, the time offset between the terminal device and the network device based on the first moment, the second moment, the third moment, and the fourth moment comprises:
determining, by the terminal device, the time offset according to the following formula:

$$O=(T_1-T_2-T_3+T_4)/2, \text{ wherein}$$

O represents the time offset, $T_1$ represents the first moment, $T_2$ represents the second moment, $T_3$ represents the third moment, and $T_4$ represents the fourth moment.

14. The method according to claim 1, wherein the first downlink message is a cell-specific reference signal CRS.

15. An apparatus, comprising:
one or more processors, and
a non-transitory storage medium configure to store program instructions;
wherein, when executed by the one or more processors, the instructions cause the apparatus to perform a method that comprises:
determining a first moment of a first downlink message, and determining a second moment of the first downlink message, wherein the first moment is a start moment of a time unit used by a network device to send the first downlink message, and the second moment is a start moment of a time unit used by a terminal device to receive the first downlink message;
wherein the determining the first moment comprises determining an expected moment of the first moment based on an initial timestamp of the network device and according to the following formula:

$$T_{1exp}=T+n \times t_1+m \times t_2, \text{ wherein}$$

$T_{1exp}$ represents the expected moment of the first moment, T represents the initial timestamp, n represents a frame number of the first downlink message, m represents a subframe number of the first downlink message, $t_1$ represents a time length of a frame, and $t_2$ represents a time length of a subframe;
determining a third moment of a first uplink message, and determining a fourth moment of the first uplink message, wherein the third moment is a start moment of a time unit used by the terminal device to send the first uplink message, and the fourth moment is a start moment of a time unit used by the network device to receive the first uplink message; and
determining a time offset between the terminal device and the network device based on the first moment, the second moment, the third moment, and the fourth moment.

16. The apparatus according to claim 15, wherein the method further comprises, before the determining the first moment of the first downlink message:
receiving cell time service information sent by the network device, wherein the cell time service information comprises downlink resource information of the first downlink message; and
receiving, based on the downlink resource information, the first downlink message sent by the network device.

17. The apparatus according to claim 16, wherein the cell time service information further comprises a temporary group network temporary identifier (TG-RNTI) of a second message.

18. The apparatus according to claim 15, wherein the determining the second moment is based on a detection moment of the first downlink message, and the detection moment of the first downlink message is a start moment of receiving the first downlink message, and the determining the second moment of the first downlink message comprises:
determining a value of an offset between the detection moment of the first downlink message and the second moment; and
determining the second moment according to the following formula:

$$T_2=T_2'-\Delta t_d, \text{ wherein}$$

$T_2$ represents the second moment, $T_2'$ represents the detection moment of the first downlink message, and $\Delta t_d$ represents the value of the offset between the detection moment of the first downlink message and the second moment.

19. An apparatus, comprising:
one or more processors, and
a non-transitory storage medium configure to store program instructions;
wherein, when executed by the one or more processors, the instructions cause the apparatus to perform a method that comprises:
determining a first moment of a first downlink message, wherein the first moment is a start moment of a time unit used by a network device to send the first downlink message;
determining a value of an offset between an expected moment of the first moment and the first moment according to the following formula:

$$\Delta T_1=T_1-T_{1exp}, \text{ wherein}$$

$\Delta T_1$ represents the value of the offset between the expected moment of the first moment and the first moment, $T_1$ represents the first moment, and $T_{1exp}$ represents the expected moment of the first moment according to the following formula:

$$T_{1exp}=T+n \times t_1+m \times t_2, \text{ wherein}$$

T represents an initial timestamp of the network device, n represents a frame number of the first downlink message, m represents a subframe number of the first downlink message, $t_1$ represents a time length of a frame, and $t_2$ represents a time length of a subframe;
generating a second message based on the first moment, wherein the second message comprises the value of the offset between the expected moment of the first moment and the first moment; and
sending the second message to a terminal device.

20. The apparatus according to claim 19, wherein the method further comprises:
determining a fourth moment of a first uplink message, wherein the fourth moment is a start moment of a time unit used by the network device to receive the first uplink message;
generating a response message of the first uplink message based on the fourth moment, wherein the response message of the first uplink message comprises the fourth moment, or the response message of the first uplink message comprises a value of an offset between an expected moment of the fourth moment and the fourth moment; and
sending the response message of the first uplink message to the terminal device.

* * * * *